(No Model.)
D. HOUGHTON.
SCREW CUTTING TOOL.
No. 272,139. Patented Feb. 13, 1883.
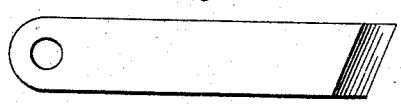
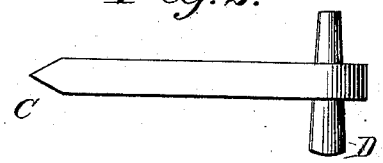
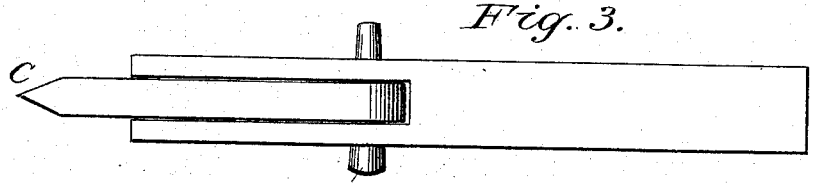
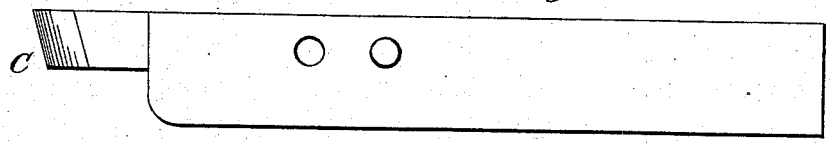
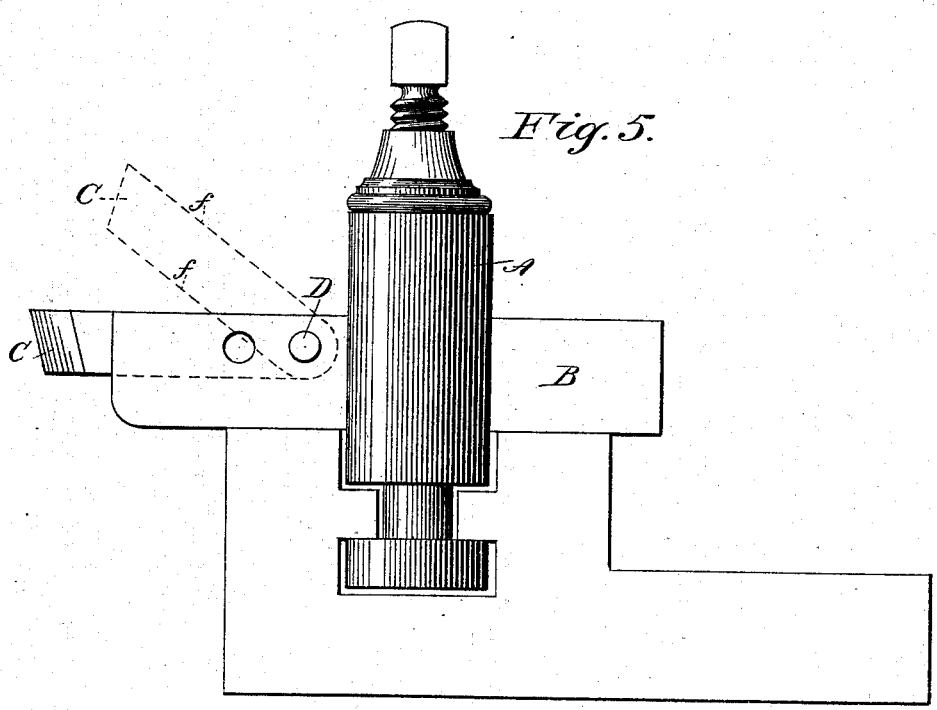
Witnesses.
Henry Searle
Henry Graver
Inventor:
Darius Houghton

UNITED STATES PATENT OFFICE.

DARIUS HOUGHTON, OF SKOWHEGAN, MAINE.

SCREW-CUTTING TOOL.

SPECIFICATION forming part of Letters Patent No. 272,139, dated February 13, 1883.

Application filed August 30, 1882. (No model.)

*To all whom it may concern:*

Be it known that I, DARIUS HOUGHTON, a citizen of the United States, residing at Skowhegan, in the county of Somerset and State of Maine, have invented a new and useful Tool for Cutting Screws in Screw-Cutting Lathes, of which the following is a specification.

Figure 5 in the accompanying drawings represents the tool-post of a screw-cutting lathe with the cutting-tool attached. Fig. 4 is a side view of tool B in Fig. 5. Fig. 3 is a top view of the same. Fig. 1 is a side view of cutter C detached. Fig. 2 is a top view of the same.

B in Fig. 5 has a slot or groove in top of sufficient depth and width to receive cutter C close fitting, but loose enough to be easily moved. At D a taper-hole is made through B and cutter C, into which a taper-pin is driven tight-fitting in B, but loose in cutter C, forming hinge or pivot for cutter C, when cutting-point of C is lifted, as shown by dotted lines $ff$.

The advantage of this tool is, when the lathe is reversed to run tool-post back, which has to be done a number of times to finish a screw, there is no necessity of drawing toolpost back, as the pivoted cutter C easily lifts and prevents dragging against the work, while with solid cutter the tool-post must be drawn back every time the lathe is reversed, to prevent destroying the work by the tool dragging.

What I claim as my invention is—

The combination of cutter C with the toolholder B of a screw-cutting engine-lathe, in the manner and for the purpose herein described.

DARIUS HOUGHTON.

Witnesses:
W. F. BACON,
F. A. NOLIN.